Oct. 16, 1956     L. H. CUTLER     2,767,295
CONTROL SYSTEM FOR SURFACE HEATING UNITS
Filed Sept. 25, 1953     2 Sheets-Sheet 1

*INVENTOR.*
LEON H. CUTLER
BY
HIS ATTORNEY

Oct. 16, 1956  L. H. CUTLER  2,767,295
CONTROL SYSTEM FOR SURFACE HEATING UNITS
Filed Sept. 25, 1953   2 Sheets-Sheet 2

INVENTOR.
LEON H. CUTLER
BY
HIS ATTORNEY

United States Patent Office 2,767,295
Patented Oct. 16, 1956

2,767,295

CONTROL SYSTEM FOR SURFACE HEATING UNITS

Leon H. Cutler, Milford, Conn., assignor to General Electric Company, a corporation of New York Application September 25, 1953, Serial No. 382,439

12 Claims. (Cl. 219—20)

This invention relates to automatically controlled heating devices, and more particularly to automatic temperature control systems for surface heating units of the type employed in cooking operations.

In the process of cooking on surface heating units it is often necessary to adjust the heat output of the unit several times to heat the cooking utensil to the desired cooking temperature in the shortest possible time and then to maintain that temperature until the cooking process is completed. Thus a person using an electric range frequently turns a heating unit on to the highest available rate of heating to bring the cooking utensil up to the desired temperature after which a lower rate of heating is selected to maintain the proper temperature. However, manual control in this manner is frequently unsatisfactory for several reasons. First, in some cooking operations such as griddling or frying in deep fat it is difficult to determine when the cooking utensil and its contents have been heated to the proper temperature; second, maintaining a constant temperature in the utensil often requires frequent adjustments of the heat output of the heating unit; and third, to avoid overheating, the change from the highest heat output to a lower heat output must be made before the desired temperature is reached if the thermal mass of the cooking load is relatively low, while on the other hand the cooking of loads having a relatively high thermal mass may be unnecessarily delayed if the change is not delayed until some time after the utensil has reached the desired cooking temperature. In other words, to achieve optimum performance in a cooking operation, it is not only necessary to quickly heat the cooking load to the desired temperature and then reduce heat input to maintain that temperature, but also it is necessary to advance or delay the change from high to low heat in accordance with the thermal mass characteristics of the utensil and its contents.

Accordingly a primary object of my invention is to provide an automatically controlled surface heating unit arranged to bring any cooking utensil quickly up to a preselected temperature and thereafter maintain that temperature within narrow limits.

Another object of my invention is to provide an automatic temperature control system for electric heating units which controls the heat output of the unit in accordance with both the temperature and the thermal mass characteristics of the material being heated.

Another object of my invention is to provide an automatic temperature control for surface heating units which is capable of anticipating the extent of overheating or underheating which may occur as a result of the thermal mass of the heat load, and to control the heating unit accordingly.

Another object of my invention is to provide an automatic surface heating unit control which includes a first temperature range and an overheating anticipator control for light frying or griddling operations, a second temperature range for boiling operations, and a third temperature range and underheating anticipator control for deep-fat frying operations.

Further objects and advantages of my invention will become apparent as the following description proceeds, and the features of novelty which characterize my invention will be pointed out with particularity in the claims annexed to and forming a part of this specification.

Briefly stated, in one embodiment of my invention I achieve the foregoing objectives by providing a heating control system in which the energization of the heating unit may be controlled by a first circuit including a temperature detector element in thermal contact with the load being heated and a second circuit arranged to generate a signal which is a function of the length of time the heating unit is energized; or by the first circuit alone; or by the first circuit plus a temperature sensitive element arranged to delay deenergization of the heating unit. The second circuit includes a pair of temperature sensitive elements of unequal thermal mass arranged to be equally heated each time the main heating unit is energized; thus during each heating cycle a varying differential between the resistances of these two elements occurs, and this differential is utilized as an anticipatory control to deenergize the heating unit somewhat before the temperature detector element reaches the preselected temperature.

For a better understanding of my invention, reference may be made to the accompanying drawing in which Fig. 1 is a cross-sectional view of a surface heating unit including the temperature detector assembly of my invention.

Figure 1:
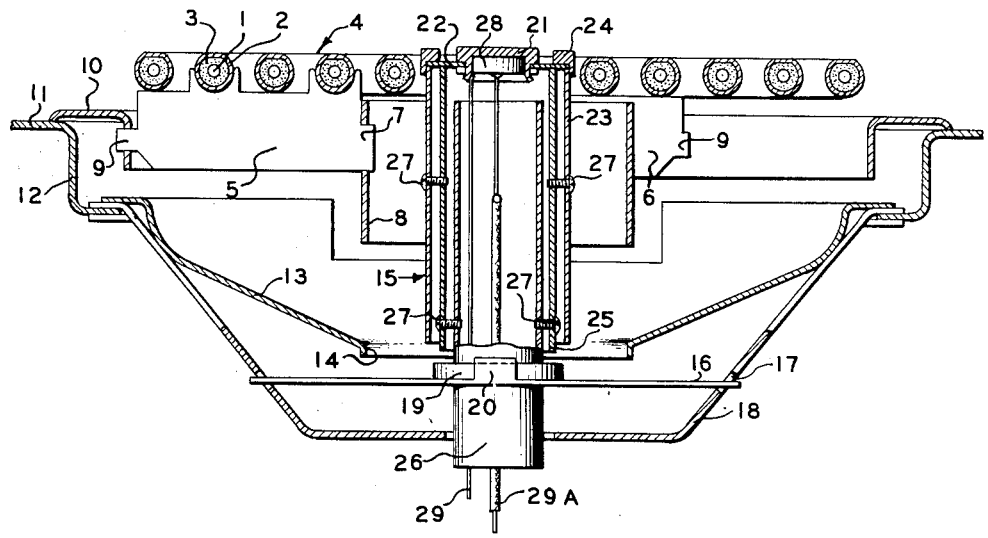
Figure 2:
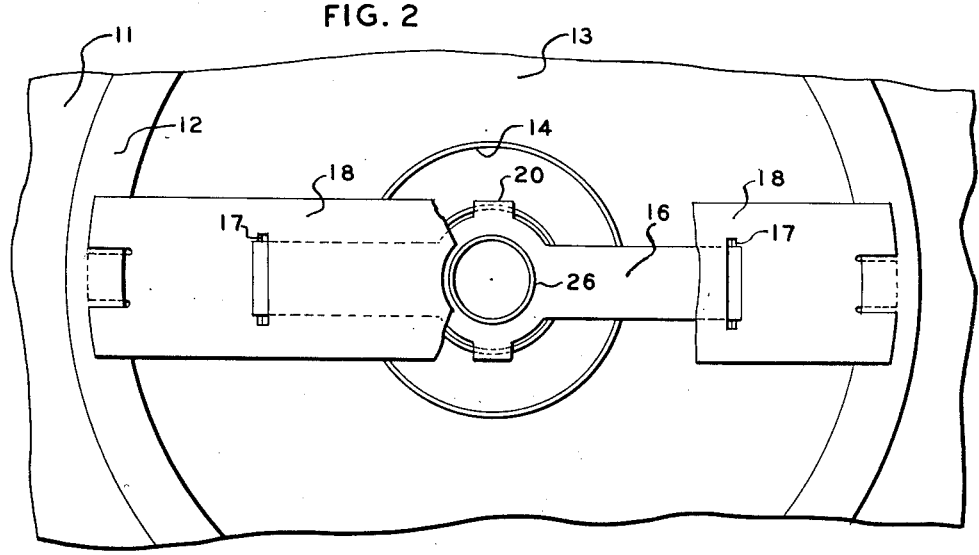
Fig. 2 is a bottom plan view of the unit shown in Fig. 1, some parts being cut away to show details of construction.

While the present invention is particularly adapted for use in conjunction with surface heating units of an electric range, I do not wish to be limited solely to this one application of my invention since the control arrangement disclosed and claimed herein may find many other applications in various types of heating devices and electric heating units. Referring to Figs. 1 and 2 of the drawing, I have shown an embodiment of my invention arranged to control an electric heating unit of the type commonly employed for the surface heaters of an electric range. Although the particular form of the heating element employed forms no part of the present invention, preferably it comprises a helical resistance conductor 1 mounted within an outer metallic sheath 2 and supported in spaced relation with reference to the outer sheath by an electrically insulating heat conducting mass 3 such as highly compressed granulated magnesium oxide. A complete heating element 4 is arranged in a spiral coil with the turns supported in spaced relation on a plurality of supporting arms such as arms 5 and 6. The innermost end of each of these supporting arms may include a projecting portion 7 arranged for rigid attachment to a cylindrical shell or heat barrier 8. The outer end of each of the supporting arms includes an ear 9 adapted to project through an aperture formed in a downwardly depending portion of an annular flanged member 10. Flanged member 10 in turn is adapted to rest on any suitable supporting surface 11, such as the cooking top of a range, so as to support the heating unit over a circular opening defined by flange 12, upon which a removable reflector or drip pan 13 having a central opening 14 is supported.

In order to control the heat output of heating element 4 in accordance with the temperature of the cooking load, it is of course necessary to provide some means for sensing that temperature, and I therefore provide a temperature detector assembly 15 mounted centrally within the heating unit and arranged to support a temperature sensitive element in contact with the bottom of a cooking utensil placed on the unit. To insure good thermal contact between the cooking utensil and the temperature sensitive element, temperature detector 15 is resiliently supported with respect to the heating unit so that its upper surface normally extends slightly above the upper surface of the heating element. In the present instance such a resilient mounting is achieved by the use of a flat spring 16, the two ends of which extend through slots 17 formed in strap-like member 18. The two ends of strap-like member 18 are clamped or otherwise secured to diametrically opposite portions of flange 12. The lower end of temperature detector 15, which is circular in cross-section, extends through aligned openings in reflector pan 13, flat spring 16, and strap-like member 18, being secured to spring 16 by means of collar 19 and its frictional engagement with upstanding ear portions 20.

Temperature detector assembly 15 comprises a metallic disk-shaped member 21 crimped or otherwise secured to a disk 22 of heat insulating material, such as mica, which in turn is secured at its periphery to the upper end of tubular shield 23 by means of clamping ring 24. Concentrically arranged within tubular shield 23 are additional shields 25 and 26, the three tubular shields being secured together by suitable means for minimizing heat transfer, such as screws 27.

From the description thus far it will be seen that disk-shaped member 21 is supported by temperature detector assembly 15 so as to be in good thermal contact with a cooking utensil placed on heating element 4 and further that it is shielded from heating element 4 so that its temperature substantially corresponds to that of the cooking utensil during a cooking operation. And since member 21 is formed from a metal which is highly conductive both thermally and electrically, such as copper or aluminum, it is apparent that temperature sensitive element 28, which is housed therein, will assume a temperature very close to the temperature of the cooking utensil.

Temperature sensitive element 28 is here shown as a cylinder supported within disk-shaped member 21 by soldering or similar means insuring good thermal and electrical contact. One of the primary requisites for element 28 is that its resistance must change greatly over the operating range of temperatures applicable. For example, in this particular application the range of temperatures desirable is from approximately 150° F. for warming operations to 400° F. for griddling operations. A thermally sensitive resistor the resistance of which changes from 500 ohms to 20 ohms over this temperature range provides a very satisfactory and reliable control employing the arrangement disclosed herein. It is also desirable, of course, that the assembled heat sensitive device be capable of withstanding the various mechanical shocks to which it is subjected during normal usage. In view of these various requirements, I find a thermistor particularly satisfactory for the thermally sensitive element 28 and hereafter element 28 will be referred to as a thermistor. By this term is meant any resistance element having a resistance which varies greatly with changes in temperature. Referring again to Fig. 1, the upper surface of thermistor 28, which in the present embodiment has a negative temperature coefficient of resistance, is in direct contact with a disk-shaped member 21, and electrical connections are provided by lead 29 which is soldered to member 21 (which may be grounded to the frame of the range), and lead 29a which is soldered to the center of the under surface of the thermistor.

Figure 3:
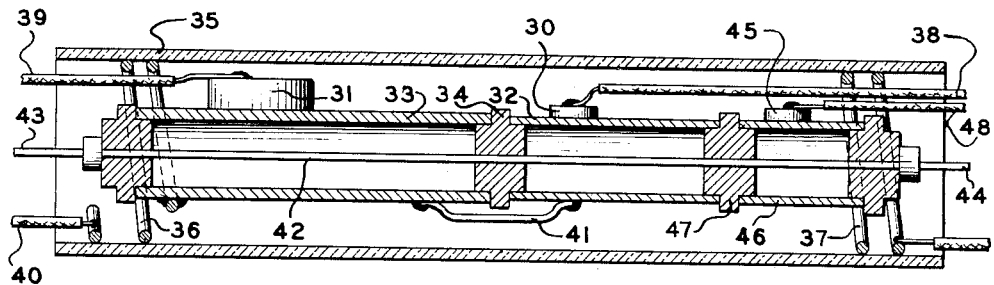
Fig. 3 is a view, partly in section, of the anticipator assembly which forms a part of my invention.

In Fig. 3 I have shown the anticipator assembly which forms a part of my invention and which is instrumental in controlling the heat output of heating unit 4 so as to prevent both overheating and underheating of the cooking load. The anticipator assembly includes thermistors 30 and 31 which have identical electrical resistance at any given temperature. However, thermistor 31 has substantially more mass than thermistor 30, and therefore the resistance of thermistor 30 changes more rapidly than the resistance of thermistor 31 when both are subjected to the same change in ambient temperature. Thermistor 30 is mounted in heat transfer relation on a metallic tubular member 32 by suitable means such as soldering or brazing. Similarly, thermistor 31 is mounted on tubular member 33, it being noted that member 33 is substantially larger than member 32 so that the total mass of thermistor 31 and member 33 is substantially greater than the total mass of thermistor 30 and member 32. In a control system for a surface heating unit of the type herein disclosed, I have found that a mass ratio of the order of 8 to 1 gives good results, but other mass ratios may be more desirable in other applications. Members 32 and 33 are mechanically connected by insulating disk 34 and supported in a tube 35 of insulating material, such as ceramic or glass, by a pair of coil springs 36 and 37.

Referring to the electrical connections for thermistors 30 and 31, a lead 38 is soldered to the top surface of thermistor 30 and a lead 39 is similarly provided for thermistor 31. A lead 40 common to both thermistors is connected to spring 36 which in turn is electrically connected as by soldering to tubular member 33. A jumper lead 41 connecting tubular members 32 and 33 is provided to complete the electrical circuit to the bottom surface of thermistor 30, it being understood that both tubular members 32 and 33 are thermally and electrically conductive, being made of a metal such as brass or copper. The anticipator assembly is heated by an electrical resistance element such as resistance wire 42 mounted concentrically with respect to tubular members 32 and 33 and connected in series with heating element 4 by electrical leads 43 and 44; thus thermistors 30 and 31 are heated by the same heat source each time heating element 4 is energized.

The anticipator assembly also includes a thermistor 45 secured in electrical and thermal contact with tubular member 46 so as to be heated by resistance wire 42. Tubular member 46 is supported in alignment with tubular member 32 by means of insulating disk 47 therebetween and spring 37. Electrical connections for thermistor 45 are provided by lead 48 soldered to the top thereof and lead 49 secured to spring 37, which is in electrical contact with tubular member 46.

Temperature detector 15 together with a manually adjustable rheostat and multi-contact switch, and the anticipator assembly illustrated in Fig. 3 are electrically connected in a control system arranged to control the heat output of heating element 4 in accordance with the variations in the resistances of the rheostat and thermistors 28, 30, 31, and 45. Preferably these elements are connected in a control network with control means responsive to the currents flowing therein for controlling means for regulating the supply of energy to the heating unit. In the embodiment of my control system herein disclosed I employ a magnetic amplifier as the control means and a relay arranged to regulate the flow of current to heating element 4. Referring now to the diagrammatic view of my control system illustrated in Fig. 4, surface heating element 4 and anticipator heater 42 are arranged to be connected across power supply lines 50 and 51 through a manually operated switch 52 and normally closed hot wire relay 53. Contactor 54 of relay 53 is operated by the expansion or contraction of hot wire 55 connected to the load windings 56 and 57 of magnetic amplifier 58 by means of rectifiers 59 and 60. Thus when the power output of magnetic amplifier 58 increases to a predetermined value hot wire 55 is heated so as to expand sufficiently to open contactor 54, thus deenergizing heating elements 4 and 42. Transformer 61 is provided to supply power to the load windings 56 and 57 of magnetic amplifier 58 and also, by means of rectifying elements 62 and 63 and filter capacitor 64, to supply direct current for the control windings 65, 66, 67 and 68. Control winding 65 is connected in series with thermistor 28 and thus the current flowing therein varies in accordance with the temperature of the cooking utensil. Similarly control winding 66 is connected in series with thermistor 30 while control winding 67 is connected in series with thermistor 31, it being recalled that these thermistors are heated by anticipator assembly heater 42.

Figure 4:
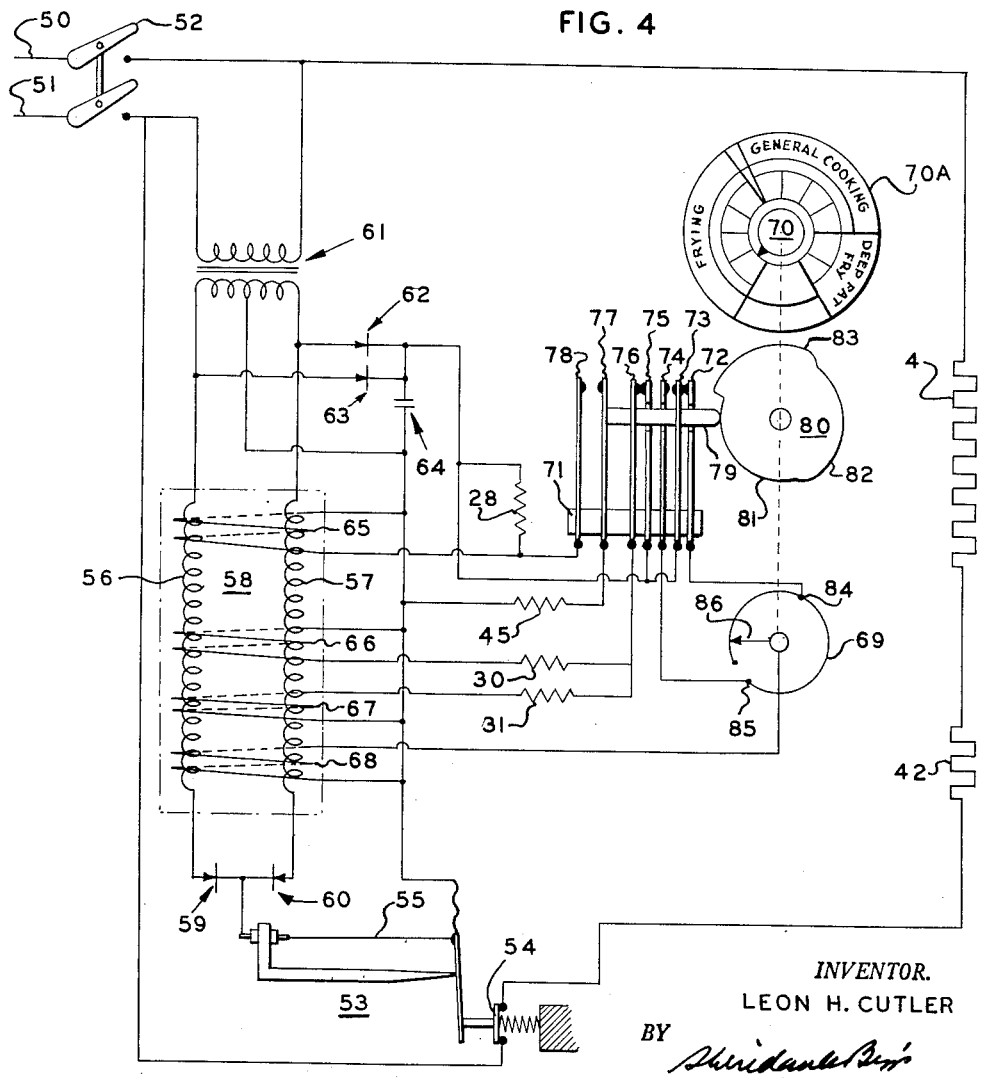
Fig. 4 is a diagrammatic view of the various components and electrical connections of my automatic control system.

Control winding 68 is connected in series with a manually adjustable tapped rheostat 69 operated by control knob 70 which cooperates with a dial plate 70a. The dial plate may be calibrated in terms of the various cooking operations as illustrated in Fig. 4. Each of the two resistance sections of rheostat 69 preferably has a maximum resistance approximately equal to the resistance of thermistor 28 at room temperature.

In order to automatically change the circuit connections in my control system by means of control knob 70, I provide a multi-contact switch mechanically associated therewith. In the present embodiment I utilize cam operated switch 71 which includes flexible contact members 72, 73, 74, 75, 76, 77 and 78, cam follower 79 and cam 80 which is mounted on a common shaft with rheostat 69 and knob 70. Cam follower 79 passes freely through openings in contact members 72, 74 and 75, but is rigidly secured to contact members 73, 76 and 77. Thus when follower 79 engages low portion 81 of cam 80, contact 72 engages contact 73 and contact 75 engages contact 76; when follower 79 engages intermediate cam portion 82 it is shifted to the left as viewed in the drawing and only contacts 73 and 74 are engaged; and further rotation of cam 80 permits high portion 83 to engage follower 79, and in this position follower 79 is shifted even further to the left so that contacts 77 and 78 are engaged as well as contacts 73 and 74. If desired line switch 52 as well as rheostat 69 and cam switch 71 may be mechanically connected to control knob 70 so that the operation of heating unit 4 may be completely controlled by a single control knob.

Referring to the circuit connections for cam switch 71 it will be seen that either the first section or the second section of rheostat 69 is in series with winding 68 depending on the position of cam 80. With the parts in the position shown in Fig. 4, terminal 84 of rheostat 69 is connected through contacts 72 and 73 to rectifiers 62 and 63. Thus the resistance of rheostat 69 is near its maximum in the position shown and decreases as control knob 70 is rotated clockwise through the "frying" range. Further rotation of knob 70 into the "general cooking" range causes intermediate portion 82 of cam 80 to engage cam follower 79 thus disengaging contacts 72 and 73 and engaging contacts 73 and 74. In this position terminal 85 of rheostat 69 is connected to rectifiers 62 and 63 and contact finger 86 of rheostat 69 is between terminals 84 and 85.

Further clockwise rotation of control knob 70 in the "general cooking" range decreases the resistance of rheostat 69; finally its resistance again reaches a minimum when the knob is rotated to the "high" position. It will be noted that contacts 75 and 76 are separated when the knob is in this range and hence no current flows in thermistors 30 and 31 and the associated control windings 66 and 67. Therefore the variations in temperature and resistance of thermistors 30 and 31 have no effect on the operation of my control system in the "general cooking" and "deep fat frying" ranges.

In the "deep-fat frying" range of the control knob 70, high portion 83 of cam 80 engages cam follower 79 and moves it to its third position in which contacts 77 and 78 as well as contacts 73 and 74 are engaged. When control knob 70 is in any position in this range thermistor 45 is connected through contacts 77 and 78 to the terminal common to thermistor 28 and control winding 65 and thus thermistor 45 is in parallel with control winding 65 and in effect bypasses current away from the control winding.

From the foregoing description it will be evident that rheostat 69 and thermistors 28, 30 and 31 are connected in parallel circuit relation with each other in an electrical network arranged to control the power output of magnetic amplifier 53 when control knob 70 is turned to a position in the "frying" range; that thermistors 30 and 31 are disconnected from the network when the control knob is rotated to the "general cooking" range; and that in the "deep-fat frying" range thermistor 45 is connected in circuit with thermistor 28 so as to decrease the sensitivity of control winding 65. As described in greater detail below rheostat 69 and thermistor 28 cooperate to produce a temperature detector signal and may therefore be referred to as being connected in opposite branches of a first parallel circuit while thermistors 30 and 31 cooperate to produce an anticipator signal and may be referred to as forming opposite branches of a second parallel circuit.

The power output of magnetic amplifier 58 and hence the current flowing in hot wire 55 is of course dependent on the algebraic sum of the ampere turns in the four signal windings 65, 66, 67 and 68. Control windings 65 and 68 are so arranged that their currents oppose each other and when equal produce a net control current very nearly zero. Similarly control windings 66 and 67 have an equal number of turns and are connected in opposing relationship so that equal currents in them cancel each other. However windings 65 and 68 have a larger number of turns than windings 66 and 67, the turn ratio being of the order of 5 to 3 for example. Thus if the current differential between windings 65 and 68 is assumed to be one milliampere, a current differential of 1.66 milliamperes of opposite polarity in windings 66 and 67 would produce a net control current of zero. The four control windings are so connected and arranged that an increase in the current in either winding 67 or 68 tends to decrease the power output of the amplifier (and thus tends to cause contactor 54 to close) while an increase in current in either winding 65 or 66 tends to increase the power output (thus tending to open contactor 54).

In describing the operation of my control system it will first be assumed that a cooking load of average thermal mass such as a cooking utensil containing approximately two pounds of vegetables and water has been placed on surface heating element 4, that switch 52 has been closed and that control knob 69 has been rotated to the appropriate position in the "general cooking" range. Cam 80 is thereby rotated to a position in which intermediate cam portion 82 engages cam follower 79 thus closing contacts 73 and 74 and opening all other contacts of cam switch 71. Arm 86 of rheostat 69 is also rotated to a corresponding angular position between terminals 84 and 85 and the resistance of rheostat 69 is thereby reduced to a value below that of thermistor 28 which at this point is assumed to be at room temperature. Because of this resistance differential the current in control winding 68 exceeds that in winding 65. The effect of this current differential is to limit the current in load windings 56 and 57 of amplifier 58 to a value below the current required to operate normally closed relay 53 and hence the relay remains closed. Thus heating element 4 and also heater 42 are energized and the heating of the cooking load is begun. As the temperature of the cooking utensil and its contents increases thermistor 28 likewise increases in temperature causing an increase in the current flowing in winding 65. Inasmuch as the resistance of rheostat 69 remains constant the current differential between windings 65 and 68 decreases thus causing an increase in the power output of the magnetic amplifier 53 which in turn causes hot wire 50 to expand and, when thermistor 28 reaches the desired temperature, to open the contacts of relay 53. Thus it is evident that when control knob 70 is set in the general cooking range heating element 4 is deenergized at the moment when thermistor 28 reaches the desired temperature; deenergization of heating element 4 is neither advanced by thermistors 30 and 31 nor delayed by thermistor 45 inasmuch as these elements are not connected in the control circuit.

As a further illustration of the operation of my control system it will now be assumed that a light frying or griddling operation such as the frying of eggs or bacon is to be performed. In this example a knob position in the "frying" range is selected and thus cam 80 and contact finger 86 of rheostat 69 are placed in positions similar to that shown in Fig. 4 whereby current is supplied to terminal 84 of the rheostat through contacts 72 and 73, and current is supplied to thermistors 30 and 31 through contacts 75 and 76. At this point thermistor 28 is at room temperature and consequently only a very small current flows in control winding 65; also because thermistors 30 and 31 are likewise at room temperature insufficient current flows in windings 66 and 67 to appreciably affect the operation of magnetic amplifier 58. Thus normally closed relay 53 remains closed because the current in control winding 68 limits the current in load windings 56 and 57 to a value below the current required to operate the relay.

Thus the cooking operation is initiated and as the temperature of the cooking utensil increases thermistor 28 likewise increases in temperature being thermally associated with the bottom of the utensil. Consequently the resistance of thermistor 28 begins to decrease and inasmuch as the resistance of rheostat 69 remains constant the current differential between control windings 65 and 68 decreases. At the same time thermistors 30 and 31 are heated by heater 42 and the resistance of thermistor 30 rapidly decreases to its minimum value. Thermistor 31, having a substantially greater thermal mass decreases in resistance at a much slower rate and consequently the current in control winding 67 increases at a slower rate than does the current in winding 66. Thus during the initial heating cycle the current in winding 66 exceeds that in winding 67, the current differential between the two windings rising rapidly to a maximum and then decreasing during the remaining portion of the cycle. As previously described the effect of this current differential is to increase the power output of magnetic amplifier 58 and it therefore aids the temperature signal produced by thermistor 28 and rheostat 69 in opening relay 53. In other words the current differential between windings 66 and 67 may be referred to as an anticipator signal which rises to a maximum before the temperature of the cooking load has increased appreciably and then decreases to zero if the first heating cycle continues until the temperatures of thermistors 30 and 31 become equal. Because the thermal mass of the assumed cooking load is relatively low its temperature will approach the desired temperature before the anticipator signal decreases to zero; hence the detector signal produced by thermistor 28 plus the anticipator signal will open relay 53 before thermistor 28 reaches the desired temperature. This of course is the desired result because the temperature of thermistor 28 tends to lag behind that of the utensil during a relatively short heating period and because heating element 4 continues to deliver heat after it is deenergized.

To further illustrate the manner in which my control system operates, it will now be assumed that a cooking load of relatively high thermal mass such as a large aluminum pan containing food to be fried in deep fat is placed on heating element 4. In this operation control knob 70 is rotated to a position in the deep fat frying range thus decreasing the resistance of rheostat 69 to a relatively low value and rotating high portion 83 of cam 80 into engagement with cam follower 79. Thus contacts 73 and 74 of switch 71 are closed so as to supply direct current to terminal 85 of rheostat 69 and contacts 77 and 78 are closed so as to connect thermistor 45 in parallel with control winding 65. Thermistor 28, being at room temperature, limits the current in winding 65 to a value considerably below the current in winding 68; consequently relay 53 remains closed and the heating cycle is initiated. As heating continues the temperatures of thermistors 28 and 45 increase, the former being heated by the cooking utensil and the latter being heated by heater 42. Thus the resistance of thermistor 28 decreases tending to increase the current flowing in control winding 65 but the resistance of thermistor 45 also decreases and, being in parallel with winding 65, shunts some of the current which would otherwise flow through the winding. Consequently in order to pass enough current to cause amplifier 58 to open relay 53 thermistor 28 must reach a temperature higher than the preselected temperature. Under these conditions it is apparent that heating element 4 will remain energized for an interval of time after thermistor 28 signals that the desired temperature has been reached. This delay in terminating the heating cycle is necessary because the temperature of thermistor 28 may be increased above that of the cooking utensil by heat radiated directly from the heating element 4 because the heat insulating shields may not be completely effective over a relatively long heating period and also because the temperature of the utensil may be somewhat higher than that of its contents. Thus it will be evident that as a result of the action of thermistor 45 the temperature of the cooking load is brought to the preselected temperature on the first heating cycle.

After heating element 4 and heater 42 are deenergized thermistor 45 begins to cool and its temperature becomes relatively low because the cooking temperature is maintained by relatively short heating cycles. Consequently its effect is minimized so long as the thermal equilibrium of the cooking load is undisturbed. However if additional food is added to the utensil its contents are sufficiently cooled to cause the temperature of thermistor 28 to drop substantially and as a result a heating cycle of relatively long duration is initiated. In this case thermistor 45 is heated long enough to cause it to exert a delaying influence and thus the control system functions to raise the temperature of the cooking load to the desired temperature in the shortest possible time.

From the above disclosure it may be seen that I have provided an improved automatic temperature control which not only maintains a cooking utensil at a uniform preselected temperature but which also controls the initial heating cycle so as to prevent both overshooting of this temperature and time consuming delays caused by failure to reach the preselected temperature on the first cycle of operation. It is also apparent that the temperature detector assembly which is subjected to the intense heat of the heating unit involves no moving parts which might become inoperative due to such temperatures or from fouling by food substances during cooking. All other components of my control system including the anticipator assembly, the magnetic amplifier, the hot wire relay, the cam switch, the rheostat and the control knob may be, and preferably are, located at remote points within the range or elsewhere where they may be adequately protected from heat and foreign substances to insure their reliability and long operating life. A further advantage of my invention resides in the provision of a separate relatively low mass heating element for the three anticipator thermistors and the location of the anticipator assembly remotely with respect to the surface heating unit. With this arrangement the anticipator thermistors cool relatively rapidly during the periods when the surface heating unit is deenergized, and function so as to shorten each heating cycle during cooking operations thus minimizing the temperature differential in the cooking load.

The present invention is an improvement over the prior invention disclosed and claimed in application Serial No. 382,423 filed September 25, 1953, by Stanley B. Welch and assigned to the assignee of the present application, and therefore I do not claim as my invention anything shown or described in the aforesaid Welch application which is to be regarded as prior art with respect to this present application.

While I have shown and described a specific embodiment of my invention, I do not desire my invention to be limited to the particular construction shown and described and I intend by the appended claims to cover all modifications within the true spirit and scope of my invention.

What I claim as new and desire to secure by Letters Patent of the United States is:

1. An automatic temperature control system comprising a heating unit, a first thermistor responsive to the temperature of the material heated by said heating unit, a second thermistor in heat transfer relation with a heat source arranged to be heated simultaneously with said heating unit, a control circuit including said thermistors and a source of electrical current, control means responsive to the current flowing in said first thermistor, a shunt circuit including switch means and said second thermistor in parallel with said control means, and means for regulating the supply of energy to said heating unit unit in accordance with the current flowing in said control means, whereby said heating unit may be controlled in accordance with the resistance variations of said first thermistor alone or the resistance variations of said first and second thermistors.

2. An automatic temperature control system comprising a heating unit, a first thermistor responsive to the temperature of the material heated by said heating unit, a second thermistor in heat transfer relation with a heat source arranged to be heated simultaneously with said heating unit, a rheostat for setting the desired temperature of said material, an electrical network including said first thermistor and said rheostat in parallel circuit relation with each other, control means including first and second current conducting means in series with said first thermistor and said rheostat respectively, said second thermistor being connected in shunting relation with said first current conducting means, switch means for disconnecting said second thermistor from said network, and means for regulating the supply of energy to said heating unit in accordance with the currents flowing in said control means, whereby said heating unit may be controlled in accordance with the resistance variations of said first thermistor alone or the resistance variations of said first and second thermistors.

3. An automatic temperature control system comprising a heating unit, a first thermistor responsive to the temperature of the material heated by said heating unit, second, third and fourth thermistors in heat transfer relation with a heat source arranged to be heated simultaneously with said heating unit, said second and third thermistors being constructed and arranged in relation to said heat source so that the rate of change of the resistance of said second thermistor is substantially higher than the rate of change of the resistance of said third thermistor when both are heated by said heat source, an electrical control network including said first, second and third thermistors in parallel circuit relation with each other, control means including first, second, and third current conducting means, switch means for alternatively disconnecting said second and third thermistors or said fourth thermistor or said second, third and fourth thermistors from said network, and means for regulating the supply of energy to said heating unit in accordance with the currents flowing in said control means, whereby said heating unit may be controlled in accordance with the resistance variations of said first thermistor alone or the resistance variations of said first, second and third thermistors or the resistance variations of said first and fourth thermistors.

4. An automatic temperature control system comprising a heating unit, a first thermistor responsive to the temperature of the material heated by said heating unit, second, third and fourth thermistors in heat transfer relation with a heat source arranged to be heated simultaneously with said heating unit, said second and third thermistors being constructed and arranged in relation to said heat source so that the rate of change of the resistance of said second thermistor is substantially higher than the rate of change of the resistance of said third thermistor when both are heated by said heat source, a rheostat for setting the desired temperature of said material, an electrical control network including said rheostat and said first, second and third thermistors in parallel circuit relation with each other, control means including first, second, third and fourth current conducting means in series with said first, second, and third thermistors and said rheostat respectively, said fourth thermistor being connected in shunting relation with said first current conducting means, switch means for alternatively disconnecting said second and third thermistors or said fourth thermistor or said second, third and fourth thermistors from said network, and means for regulating the supply of energy to said heating unit in accordance with the currents flowing in said control means, whereby said heating unit may be controlled in accordance with the resistance variations of said first thermistor alone or the resistance variations of said first, second and third thermistors or the resistance variations of said first and fourth thermistors.

5. An automatic temperature control system comprising a heating unit, a first thermistor responsive to the temperature of the material heated by said heating unit, a second thermistor in heat transfer relation with a heat source arranged to be heated simultaneously with said heating unit, a control circuit including said first thermistor and a source of electrical current, a magnetic amplifier including a control winding in series with said first thermistor, a shunt circuit including switch means and said second thermistor in parallel with said control winding, and means for regulating the supply of energy to said heating unit in accordance with the power output of said magnetic amplifier, whereby said heating unit may be controlled in accordance with the resistance variations of said first thermistor alone or the resistance variations of said first and second thermistors.

6. An automatic temperature control system comprising a heating unit, a first thermistor responsive to the temperature of the material heated by said heating unit, a second thermistor in heat transfer relation with a heat source arranged to be heated simultaneously with said heating unit, a rheostat for setting the desired temperature of said material, an electrical network including said first thermistor and said rheostat in parallel circuit relation with each other, a magnetic amplifier including first and second control windings in series with said first thermistor and said rheostat respectively, said second thermistor being connected in shunting relation with said first control winding, switch means for disconnecting said second thermistor from said network, and means for regulating the supply of energy to said heating unit in accordance with the power output of said magnetic amplifier, whereby said heating unit may be controlled in accordance with the resistance variations of said first thermistor alone or the resistance variations of said first and second thermistors.

7. An automatic temperature control system comprising a heating unit, a first thermistor responsive to the temperature of the material heated by said heating unit, second, third and fourth thermistors in heat transfer relation with a heat source arranged to be heated simultaneously with said heating unit, said second and third thermistors being constructed and arranged in relation to said heat source so that the rate of change of the resistance of said second thermistor is substantially higher than the rate of change of the resistance of said third thermistor when both are heated by said heat source, an electrical control network including said first, second and third thermistors in parallel circuit relation with each other, a magnetic amplifier including first, second and third control windings in series with said first, second and third thermistors respectively, said fourth thermistor being connected in shunting relation with said first control winding, switch means for alternatively disconnecting said second and third thermistors or said fourth thermistor or said second, third and fourth thermistors from said network, and means for regulating the supply of energy to said heating unit in accordance with the power output of said magnetic amplifier whereby said heating unit may be controlled in accordance with the resistance variations of said first thermistor alone or the resistance variations of said first, second and third thermistors or the resistance variations of said first and fourth thermistors.

8. An automatic temperature control system comprising a heating unit, a first thermistor responsive to the temperature of the material heated by said heating unit, second, third and fourth thermistors in heat transfer relation with a heat source arranged to be heated simultaneously with said heating unit, said second and third thermistors being constructed and arranged in relation to said heat source so that the rate of change of the resistance of said second thermistor is substantially higher than the rate of change of the resistance of said third thermistor when both are heated by said heat source, a rheostat for setting the desired temperature of said material, an electrical control network including said rheostat and said first, second and third thermistors in parallel circuit relation with each other, a magnetic amplifier including first, second, third, and fourth control windings in series with said first, second, and third thermistors and said rheostat respectively, said fourth thermistor being connected in shunting relation with said first control winding, switch means for alternatively disconnecting said second and third thermistors, or said fourth thermistor, or said, second, third and fourth thermistors from said network, and means for regulating the supply of energy to said heating unit in according with the power output of said magnetic amplifier, whereby said heating unit may be controlled in accordance with the resistance variations of said first thermistor alone or the resistance variations of said first, second and third thermistors or the resistance variations of said first and fourth thermistors.

9. An automatic temperature control for an electric surface heating unit comprising a first thermistor arranged to receive heat from a cooking utensil placed on said unit, a heating element connected in circuit with said heating unit and arranged to be energized simultaneously therewith, a second thermistor supported in heat transfer relation with said heating element, said second thermistor and said heating element being remotely located with respect to said heating unit, a control circuit including said first thermistor and a source of electrical current, a magnetic amplifier including a control winding in series with said first thermistor, a shunt circuit including a manually operable switch and said second thermistor in parallel with said control winding, and means for regulating the supply of energy to said heating unit in accordance with the power output of said magnetic amplifier, whereby said heating unit may be controlled in accordance with the resistance variations of said first thermistor alone or the resistance variations of said first and second thermistors.

10. An automatic temperature control for an electric surface heating unit comprising a first thermistor arranged to receive heat from a cooking utensil placed on said unit, a heating element connected in circuit with said heating unit and arranged to be energized simultaneously therewith, a second thermistor supported in heat transfer relation with said heating element, said second thermistor and said heating element being remotely located with respect to said heating unit, a rheostat for setting the desired temperature of said utensils, an electrical network including said first thermistor and said rheostat in parallel circuit relation with each other, a magnetic amplifier including first and second control windings in series with said first thermistor and said rheostat respectively, said second thermistor being connected in shunting relation with said first control winding, a manually operable switch for disconnecting said second thermistor from said network, and means for regulating the supply of energy to said heating unit in accordance with the power output of said magnetic amplifier, whereby said heating unit may be controlled in accordance with the resistance variations of said first thermistor alone or the resistance variations of said first and second thermistors.

11. An automatic temperature control for an electric surface heating unit comprising a first thermistor arranged to receive heat from a cooking utensil placed on said unit, a heating element connected in circuit with said heating unit and arranged to be energized simultaneously therewith, second, third and fourth thermistors supported in heat transfer relation with said heating element, said thermistors and said heating element being remotely located with respect to said heating unit, said second and third thermistors being constructed and arranged in relation to said heat source so that the rate of change of the resistance of said third thermistor when both are heated by said heat source, an electrical control network including said first, second and third thermistors in parallel circuit relation with each other, a magnetic amplifier including first, second and third control windings in series with said first, second and third thermistors respectively, said fourth thermistor being connected in shunting relation with said first control winding, a manually operable switch including a pair of contacts in circuit with said second and third thermistors and a pair of contacts in circuit with said fourth thermistor, said switch being constructed and arranged for alternatively disconnecting said second and third thermistors or said fourth thermistor or said second, third and fourth thermistors from said network, and means for regulating the supply of energy to said heating unit in accordance with the power output of said magnetic amplifier whereby said heating unit may be controlled in accordance with the resistance variations of said first thermistor alone or the resistance variations of said first, second and third thermistors, or the resistance variations of said first and fourth thermistors.

12. An automatic temperature control for an electric surface heating unit comprising a first thermistor arranged to receive heat from a cooking utensil placed on said unit, a heating element connected in circuit with said heating unit and arranged to be energized simultaneously therewith, second, third and fourth thermistors supported in heat transfer relation with said heating element, said second and third thermistors being constructed and arranged in relation to said heat source so that the rate of change of the resistance of said second thermistor is substantially higher than the rate of change of the resistance of said third thermistor when both are heated by said heating element, said thermistors and said heating element being remotely located with respect to said heating unit, a rheostat for setting the desired cooking temperature, an electrical control network including said rheostat and said first, second, and third thermistors in parallel circuit relation with each other, a magnetic amplifier including first, second, third and fourth control windings in series with said first, second and third thermistors and said rheostat respectively, said fourth thermistor being connected in shunting relation with said first control winding, a manually operable switch including a pair of contacts in circuit with said second and third thermistors and a pair of contacts in circuit with said fourth thermistor, said switch being constructed and arranged for alternatively disconnecting said second and third thermistors or said fourth thermistor or said second, third and fourth thermistors from said network, and means for regulating the supply of energy to said heating unit in accordance with the power output of said magnetic amplifier, whereby said heating unit may be controlled in accordance with the resistance variations of said first thermistor alone or the resistance variations of said first, second and third thermistors or the resistance variations of said first and fourth thermistors.

(References on following page)

References Cited in the file of this patent

UNITED STATES PATENTS

| | | |
|---|---|---|
| 2,015,838 | Borden | Oct. 1, 1935 |
| 2,148,491 | Moore | Feb. 28, 1939 |
| 2,218,502 | Breitenstein | Oct. 22, 1940 |
| 2,236,624 | Littwin | Apr. 1, 1941 |
| 2,413,128 | Wills | Dec. 24, 1946 |
| 2,488,580 | Burleigh | Nov. 22, 1949 |
| 2,496,860 | Davis | Feb. 7, 1950 |
| 2,568,411 | Reed | Sept. 18, 1951 |
| 2,709,216 | Moran et al. | May 24, 1955 |